United States Patent [19]

Hasushita

[11] Patent Number: 5,216,546

[45] Date of Patent: Jun. 1, 1993

[54] ATTACHMENT LENS SYSTEM FOR CLOSE-UP PHOTOGRAPHY

[75] Inventor: Sachio Hasushita, Tokyo, Japan

[73] Assignee: Asashi Kogaku Kogyo K.K., Tokyo, Japan

[21] Appl. No.: 505,640

[22] Filed: Apr. 6, 1990

[30] Foreign Application Priority Data

Apr. 7, 1989 [JP] Japan ..................................... 1-88364
Mar. 16, 1990 [JP] Japan ..................................... 2-65596

[51] Int. Cl.$^5$ ............................................. G02B 15/02
[52] U.S. Cl. ..................................... 359/673; 359/672
[58] Field of Search ............... 350/422, 477, 428, 430; 359/672, 673, 705, 693

[56] References Cited

U.S. PATENT DOCUMENTS

4,929,068  5/1990  Tsuji ................................... 350/422

Primary Examiner—Paul M. Dzierzynski
Attorney, Agent, or Firm—Sughrue, Mion, Zinn, Macpeak & Seas

[57] ABSTRACT

An attachment lens system for close-up photography in use with a master lens system in such a fashion that the attachment lens system is attached to the front of the master lens system, comprising a first lens as a positive component, a second lens whose face on the object side is convex, the second lens serving as a positive component, a third lens whose face on the master lens side is concave, the third lens serving as a negative component, and the first to third lenses being arranged in this order from the object to the master lens system, and the specific conditions on the working distance, a negative power of the lens system of the attachment lens system on the master lens system side, and the thicknesses of the specific lenses contained in the attachment lens system being satisfied.

6 Claims, 13 Drawing Sheets

ATTACHMENT LENS SYSTEM FOR CLOSE-UP PHOTOGRAPHY

BACKGROUND OF THE INVENTION

The present invention relates to an attachment lens system for close-up photography used with a master lens in such a fashion that the attachment lens system is attached to the front of the master lens, and more particularly to an attachment lens system for close-up photography suitable for macrophotography at a magnification exceeding unity magnification in the case where the master lens is a macrophotographic lens unit (hereinafter referred to a "macro-lens").

There has been known an attachment lens for close-up photography in use with a master lens in such a fashion that the attachment lens is attached to the front of the master lens. This type of lens, particularly, the attachment lens of low magnification is categorized into two types of lens; a lens consisting of a single lens element and a cemented lens consisting of two lens elements ("smc PENTAX close-up lens S40"), manufactured by ASAHI KOGAKU KOGYO K.K. may typically be enumerated as a single lens element type available on the market and "6×7 smc PENTAX close-up lens T132" manufactured by the same company may typically be enumerated as a cemented lens type. The lens of the type in which a macro-lens is used for the master lens, with magnification of 1 to 2 contains typically "smc PENTAX dental close-up lens DS9" for a cemented lens consisting of two lens elements, and the lens disclosed in Japanese Patent Unexamined Publication No. 53-16628 for a cemented lens consisting of four lens elements.

In the single lens element and the cemented lens of two lens elements, a working distance in a condition that rays of light coming from a point infinitely distance are incident on the master lens is small, at most approximately 0.9 to 1.0 times a focal distance of the attachment lens. Accordingly, at some specific magnifications, an object per se casts its shadow on the lens.

There is a lens whose working distance is large, approximately 1.2 times a focal distance of the attachment lens, as disclosed in the above-described publication. This lens is constructed with four groups, each consisting of a single lens element. When comparing with an ordinary lens consisting of one or two lens elements, the instant lens suffers from an increased cost. Further, the second to fourth lens elements of the lens are greatly sensitive. Because of this, an error in the manufacturing stage leads to an amplified degradation of the performance of the resultant lens. Additionally, in macrophotography over unity magnification, it is possible to unsatisfactorily compensate for the lateral chromatic aberration and the coma aberration.

SUMMARY OF THE INVENTION

Accordingly, an object of the present invention is to provide an attachment lens system for close-up photography which is simple in construction, and operable with a satisfactory working distance even for macrophotography, which minimizes an aberration arising from attachment of the attachment lens to the master lens, and which satisfactorily compensates for the aberrations in a broad range of magnifications.

To achieve the above and other objects, there is provided an attachment lens system for close-up photography in use with a master lens system in such a fashion that the attachment lens system is attached to the front of the master lens system, comprising:

a first lens as a positive component;

a second lens whose face on the object side is convex, the second lens serving as a positive component;

a third lens whose face on the master lens system side is concave, the third lens serving as a negative component; and the first to third lenses being arranged in this order from the object to the master lens system, and the attachment lens system meets the following conditions:

$$1.10 < h_I/h_M < 1.35 \tag{1}$$

$$-3.0 < f_A/f_{AL} < -1.0 \tag{2}$$

$$0.10 < \frac{d_{II} + d_{III}}{f_A} < 0.25 \tag{3}$$

where $h_I$ is the incident height of the paraxial rays on the face of the attachment lens system, which is closest to the object, when the master lens is placed in an afocal state, $h_M$ is the incident height of the paraxial rays on the face of the attachment lens system, which is closest to the master lens system, when the master lens system is placed in an afocal state, $f_A$ is the focal distance of the attachment lens system, $$f_{AL} = \frac{r_{III2}}{1 - n_{III}}$$

is the focal distance of the face of the attachment lens closest to the master lens system, $r_{III2}$ is the radius of curvature of a second face of the third lens, $n_{III}$ is the refractive index of a d-line of the third lens, and $d_{II}$, $d_{III}$ is the thickness of the second and third lens.

In the attachment lens, it is preferable to satisfy the following conditions:

$$0.9 < r_{III1}/r_{III2} < 1.5 \tag{4}$$

$$0.7 < f_A/f_I < 1.3 \tag{5}$$

$$12 < \frac{v_I + v_{II}}{2} - v_{III} \tag{6}$$

where $r_{II1}$ is the radius of curvature of a first face of the second lens, $f_I$ is the focal distance of the first lens, and $v_I$, $v_{II}$, $v_{III}$ is the Abbe numbers of the first to third lenses.

Further, it is preferable to arrange the attachment lens system such that the second and third lenses are coupled in the form of a meniscus lens, i.e., a cemented lens whose convex face faces the object, and the overall lens system contains three lens elements into two groups to meet the following condition:

$$-1.0 < r_{III1}/f_A < -0.4 \tag{7}$$

where $r_{III1}$ is the radius of the first face of the third lens.

Furthermore, when the attachment lens system is composed of three lens elements of three groups, it is preferable to meet the following condition:

$$-5.0 < r_{III1}/f_A < -1.5 \tag{8}$$

The reason why the two positive lenses are provided on the object side follows. To increase the working distance, it is necessary to increase a negative power of the face of the attachment lens system closest to the master lens system. With only one positive lens, it is impossible to fully compensate for the aberrations.

To minimize the performance degradation due to manufacturing error, it is preferable to cement the second and third lenses together. The cemented lens produces less aberrations of higher order.

In the present invention, the lens face of the lens closest to the master lens system has a strong negative power. A first principal point of the attachment lens system is located outside the object point of the lens, thereby increasing the working distance. With this, the aberrations such as spherical aberration and chromatic aberration, are well compensated for.

DESCRIPTION OF THE CONDITIONS

The conditions as mentioned above will be described.

The conditions (1) to (3) are indispensable for increasing the working distance and improving the performance of the lens system.

The condition (1) is defined for increasing the working distance. When the upper limit is exceeded, the working distance can be increased, but the three-lens structure fails to compensate for the spherical aberration and the chromatic aberration. When the lower limit is exceeded, the various aberrations may be well compensated for but the obtained working distance is short. Under this condition, it is impossible to attain the object of the present invention.

The single- or double-lens structure is equivalent to the lens operating below the lower limit.

The condition (2) relates to a negative power of the face of the third lens, which is closer to the master lens system. The condition (3) relates to the thickness of the second and third lenses.

Above the upper limit of the condition (2), the negative power of the face of the lens closer to the master lens system is small, to thereby obtain an unsatisfactory working distance. Below the lower limit, the working distance is satisfactory, but the other face of the lens fails to compensate for the various aberrations due to the great negative power.

The lens disclosed in the above-described Japanese Patent Unexamined Publication No. 53-16628 operates below the lower limit. Although this lens system includes four lens elements, it is insufficient to compensate for the aberration on the enlargement side. Some of the lenses of the single- or double-lens structure may satisfy the condition (2) but the focal distances of such lenses are several times or ten times or more larger than that of the master lens system. Namely, the refractive power of the attachment lens is small. Accordingly, the macro-range magnification is small. It is evident that the lenses operate below the lower limit of the condition (1).

When the lower limit of the condition (3) is exceeded, it is difficult to increase the working distance. To increase the working distance under this condition, the face of the lens existing on the master lens side must have such a great negative power as to exceed the lower limit of the condition (2). This is undesirable. Further, when it exceeds the upper limit, the second and third lenses are bulky in volume and heavy in weight. The bulky and heavy lenses are unsuitable for the attachment lens.

The conditions (4) and (5) are defined for compensating for the aberrations generated by the face of the lens having a strong divergence, which is located on the master lens side. The condition (4) defines the radius of curvature of the first face of the second lens, which is located on the object side. The condition (5) defines the focal distance of the first lens. The second and third lenses function mainly to increase the working distance. Under the condition (4), the aberration, within the groups of the second and third lenses are compensated to a certain degree. The attachment lens system must have a positive power for the close-up photography. In the present invention, the first lens plays its role, as indicated by the condition (5). Attempt to realize those two objects by using the structure of two lens elements would fail to compensate for the spherical aberration, coma aberration, and astigmatism.

When the upper limit of the condition (4) is exceeded, the compensation of the aberration generated by the face of the lens on the master lens side is poor. When the lower limit is exceeded, that compensation is excessive. Under this condition, the aberrations of high order tends to occur.

The condition (5) is used for supplementing the condition (4), and for compensating for coma aberration and astigmatism. Above the upper limit of the relation (5), the power of the first lens becomes excessively large. The aberrations by the face of the lens on the master lens side is excessively compensated. Below the lower limit, the power of the first lens group is too small. Under this condition, the positive power of the first and second lenses groups tend to increase. It is difficult to secure the lower limit of the condition (4). This leads to degradation of the performance of the lens due to the aberrations.

In the attachment lens system of the type in which it is attached to the front of the master lens, the master lens functions to increase the longitudinal chromatic aberration and the lateral aberration by the attachment lens system in proportion to its magnification (the longitudinal chromatic aberration is magnified by the magnification squared). Therefore, it is necessary to minimize the aberrations in the attachment lens system. Conditions (6) to (8) are the conditions to minimize the aberrations. When the quantity is below the lower limit of the condition (6), the compensation of the longitudinal chromatic aberration is poor.

The conditions (7) and (8) are used for making the best compromise between the longitudinal chromatic aberration and the lateral chromatic aberration. The condition (7) is applied for the case that the second and third lenses are cemented together and constructed with three lens elements in two groups. The condition (8) is applied for the case that the second and third lenses are separated from each other and constructed with three lens elements in three groups. In both conditions (7) and (8), when the upper limit is exceeded, the compensation of the lateral chromatic aberration is properly carried out, but the compensation of the longitudinal chromatic aberration is excessively effected. When the lower limit is exceeded, it fails to compensate for the lateral chromatic aberration.

The relation (8) describes the condition for the first face of the third lens when the cemented lens is disintegrated. To obtain an effect comparable to that of the cemented lens, therefore, the curvature of it must be reduced (the radius of curvature is increased) to be smaller than that in the condition (7).

DESCRIPTION OF EXAMPLES

The present invention was embodied into embodiments 1 to 6. Those embodiments will be described using specific numerical values for specification items of the attachment lens. The data in embodiment 1 of Japanese Patent Unexamined Publication No. 62-227111, entitled "Telephoto Lens Capable of Close-Up Photographing" were directly used for the specifications of a master lens used, except that $F_{NO}$ was set at 1 : 4. The symbols used and their meanings are as follows:

$F_{NO}$: Diameter ratio of the master lens
$f_M$: Focal distance when the master lens is set in an afocal state
$f_B$: Back focus
m: Magnification of the whole lens system
WD: Object distance
r: Radius of curvature of the face of each lens
d: Lens thickness or lens interval
N: Refractive index
$v$: Abbe numbers of each lens
A: Attachment lens

EXAMPLE 1

$F_{NO} = 1:4$  $f_A = 84.48$  $f_M = 100.2$
$m = -1.186 - -2.165$  $f_B = 45.51$
WD = 102.5 − 63.9

Figure 1:
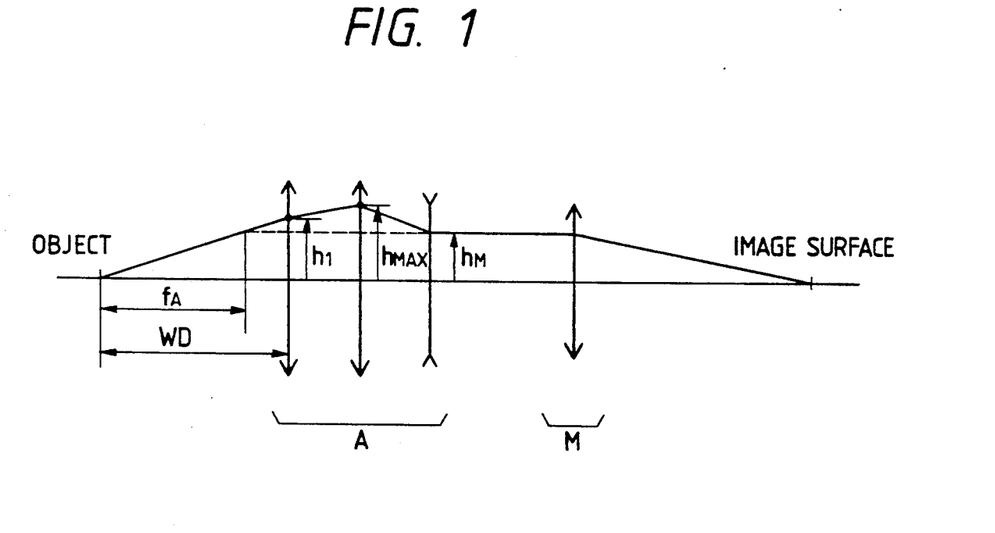
FIG. 1 is an explanatory diagram for explaining the principles of the invention, in which $h_I$, $h_M$ is the incident height of the paraxial rays on the first face of the lens (closest to the object) and on the face of the lens, which is located on the master lens side, when the master lens is placed in an afocal state, and $h_{MAX}$ is the maximum incident height of the paraxial rays on the first face of the lens (closest to the object) and on the face of the lens, which is located on the master lens side, when the master lens is placed in an afocal state.
Figure 2:
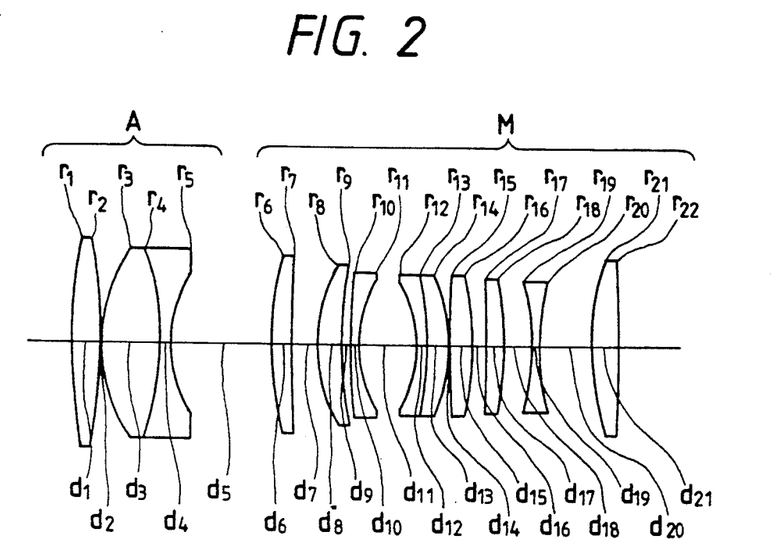
FIGS. 2, 6, 10, 14, 18 and 22 are arrangements of lens systems when the master lens is in an afocal state according to first to sixth embodiments of the present invention.
Figure 3:
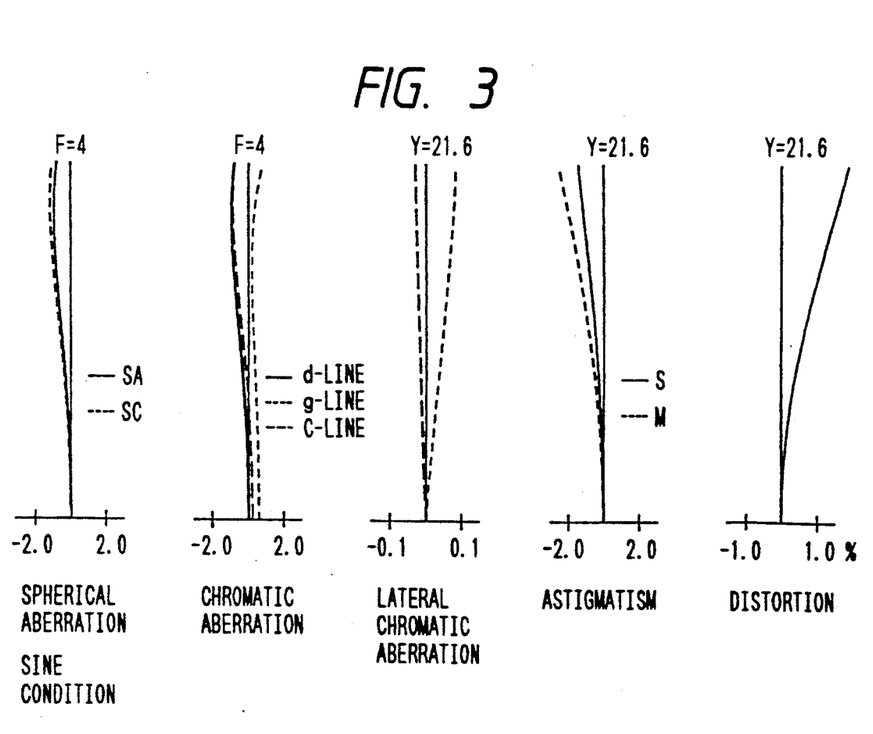
FIGS. 3, 7, 11, 15, 19 and 23 are diagrams for explaining the various types of aberrations for the afocal state according to the first to sixth embodiments of the present invention.
Figure 4:
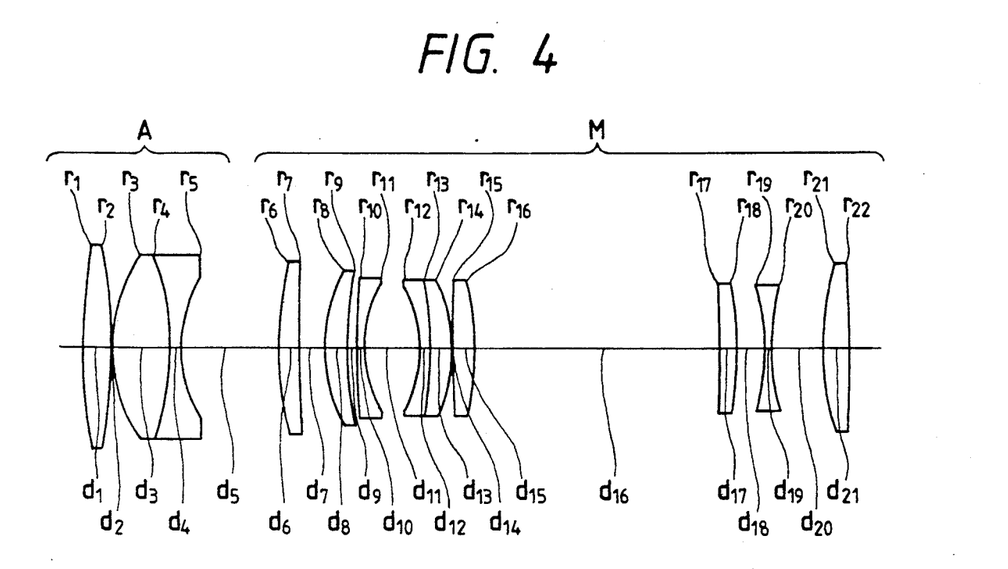
FIGS. 4, 8, 12, 16, 20, and 24 are arrangements of lenses for the close-up photography according to the first to sixth embodiments of the present invention.
Figure 5:
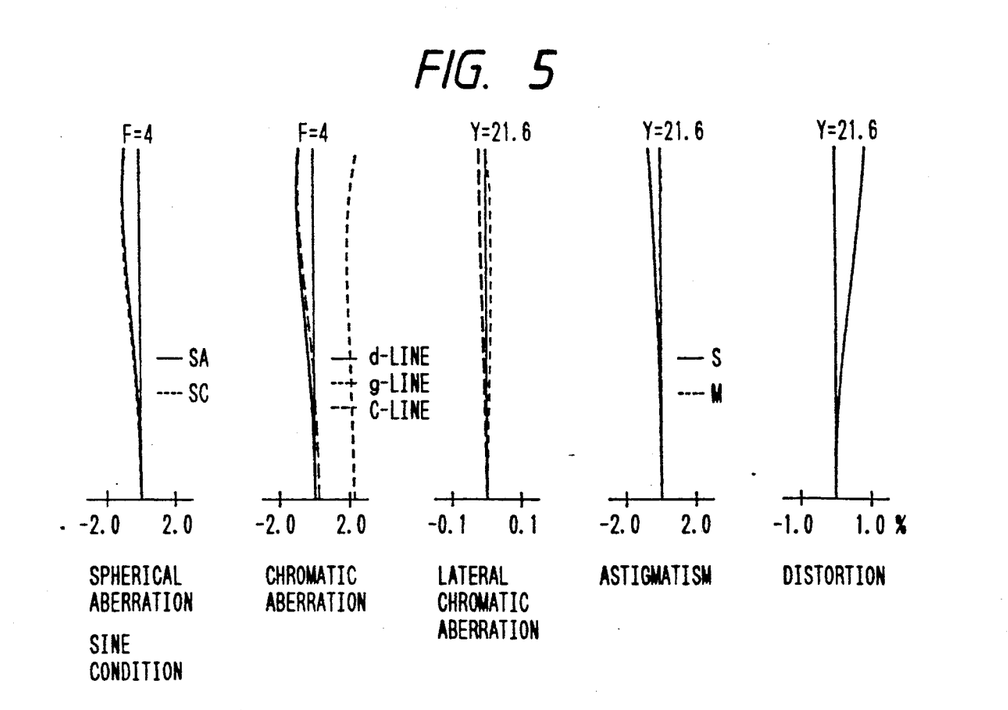
FIGS. 5, 9, 13, 17, 21 and 25 are diagrams for explaining various types of aberrations for the close-up photographing according to the first to sixth embodiments of the invention.

| | Surface No | r | d | N | $v$ |
|---|---|---|---|---|---|
| A | 1 | 104.140 | 5.70 | 1.62299 | 58.2 |
| | 2 | −104.140 | 0.20 | | |
| | 3 | 31.900 | 11.83 | 1.64000 | 60.1 |
| | 4 | −51.387 | 2.00 | 1.70154 | 41.2 |
| | 5 | 26.790 | 20.00 | | |
| M | 6 | 64.764 | 4.30 | 1.78590 | 44.2 |
| | 7 | 473.491 | 4.77 | | |
| | 8 | 31.180 | 4.80 | 1.80610 | 40.9 |
| | 9 | 75.635 | 1.80 | | |
| | 10 | 152.788 | 1.50 | 1.80518 | 25.4 |
| | 11 | 25.817 | 11.67 | | |
| | 12 | −24.386 | 1.80 | 1.74000 | 28.3 |
| | 13 | −83.740 | 4.50 | 1.80610 | 40.9 |
| | 14 | −32.411 | 0.15 | | |
| | 15 | 250.715 | 4.60 | 1.72000 | 42.0 |
| | 16 | −54.589 | 2.50−47.58 | | |
| | 17 | −906.318 | 3.70 | 1.80518 | 25.4 |
| | 18 | −67.189 | 5.36 | | |
| | 19 | −51.897 | 1.50 | 1.80610 | 40.9 |
| | 20 | 47.120 | 10.20 | | |
| | 21 | 50.044 | 5.43 | 1.51633 | 64.1 |
| | 22 | −466.238 | | | |

(1) $h_1/h_M = 1.21$
(2) $f_A/f_{AL} = -2.2$ (3) $\dfrac{d_{II} + d_{III}}{f_A} = 0.164$ (4) $r_{III}/r_{III2} = 1.192$
(5) $f_A/f_1 = 1.23$ (6) $\dfrac{v_I + v_{II}}{2} - v_{III} = 18$ (7) $r_{III1}/f_A = -0.63$

EXAMPLE 2

$F_{NO} = 1:4$  $f_A = 83.87$
$m = -1.194 - -2.177$  $f_B = 45.51$
WD = 101.0 − 62.9

Figure 6:
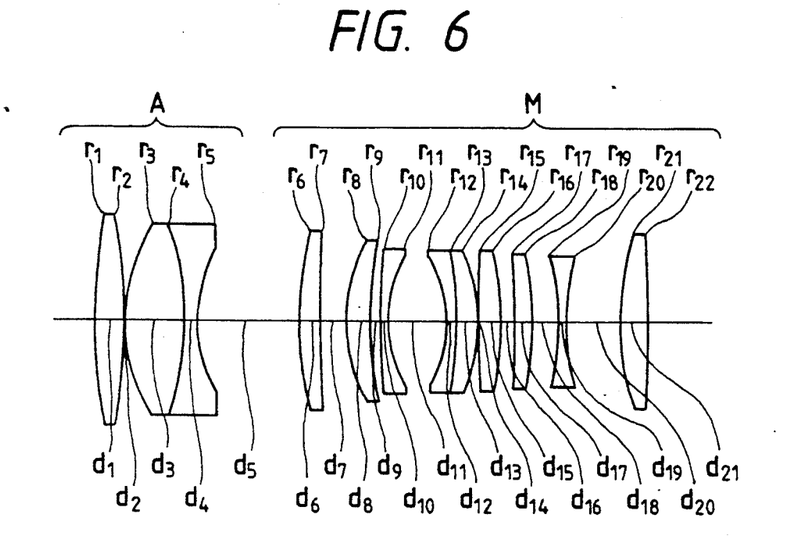
Figure 7:
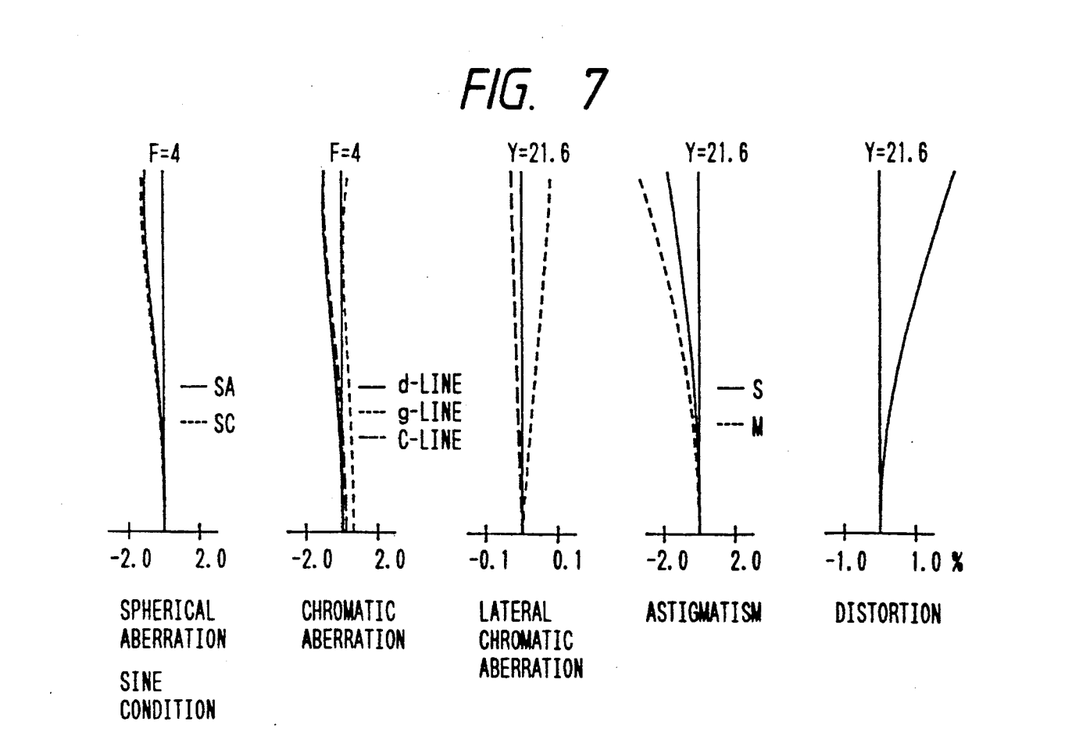
Figure 8:
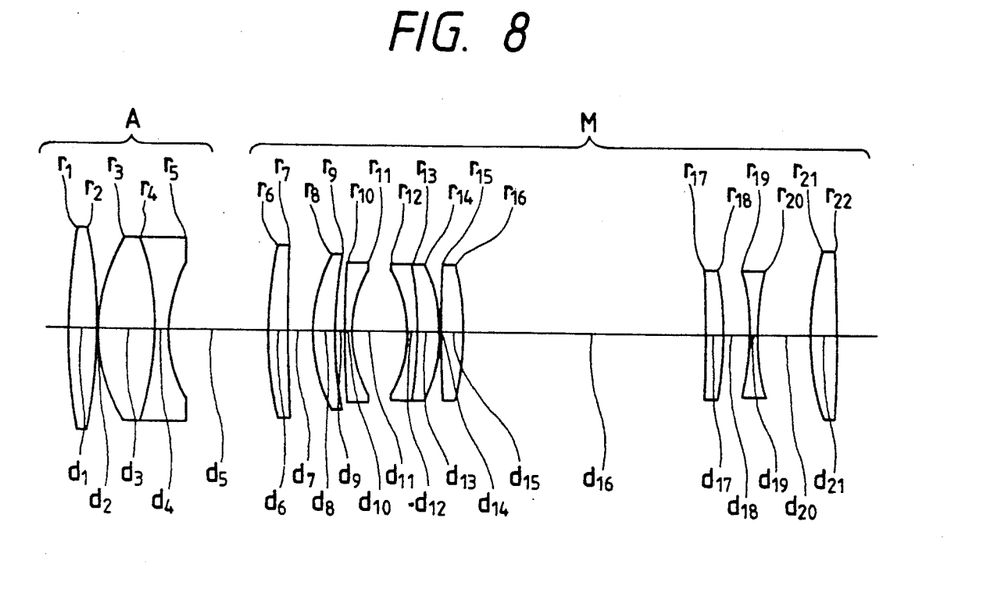
Figure 9:
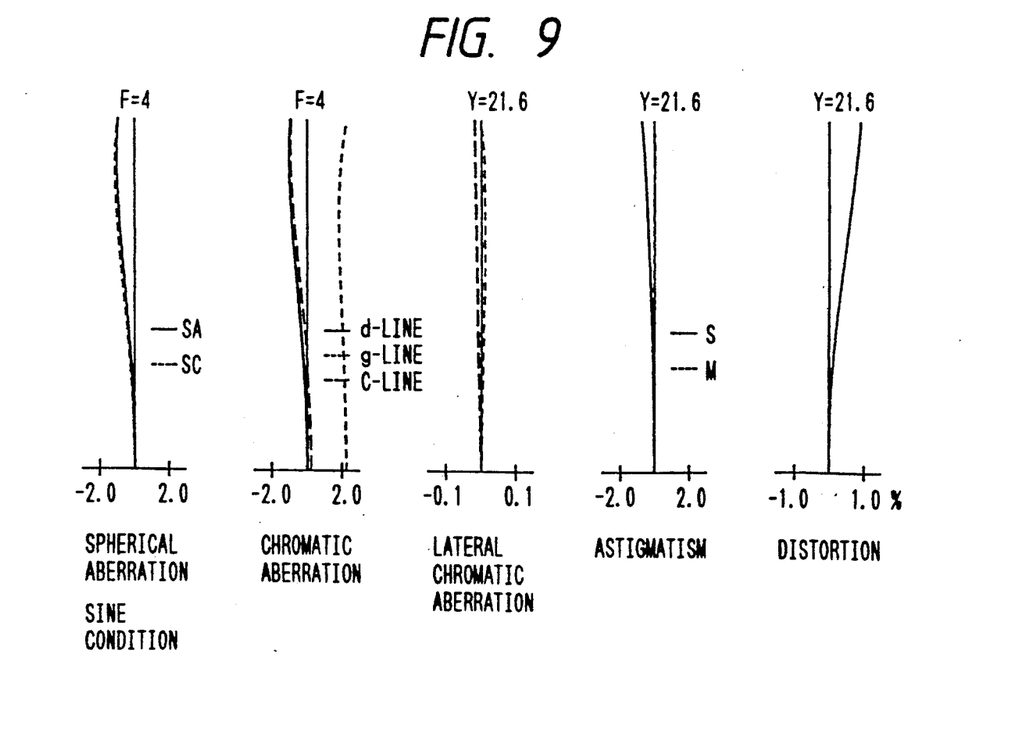

| | Surface No. | r | d | N | $v$ |
|---|---|---|---|---|---|
| A | 1 | 100.455 | 5.80 | 1.62041 | 60.3 |
| | 2 | −100.455 | 0.20 | | |
| | 3 | 34.227 | 11.80 | 1.64000 | 60.1 |
| | 4 | −52.900 | 2.30 | 1.70154 | 41.2 |
| | 5 | 28.470 | 20.00 | | |

M is the same as that of Example 1.
(1) $h_1/h_M = 1.22$
(2) $F_A/f_{AL} = -2.08$ (3) $\dfrac{d_{II} + d_{III}}{f_A} = 0.168$ (4) $r_{III1}/r_{III2} = 1.204$
(5) $f_A/f_1 = 1.20$ (6) $\dfrac{v_I + v_{II}}{2} - v_{III} = 19$ (7) $r_{III1}/f_A = -0.61$

Example 3

$F_{NO} = 1:4$  $f_A = 88.60$
$m = -1.131 - -2.123$  $f_B = 45.51$
WD = 105.1 − 63.8

Figure 10:
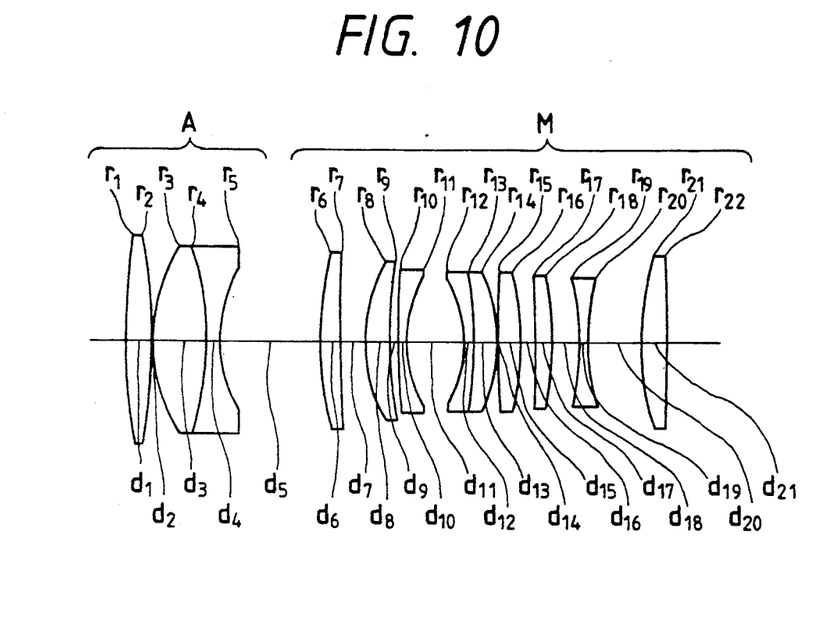
Figure 11:
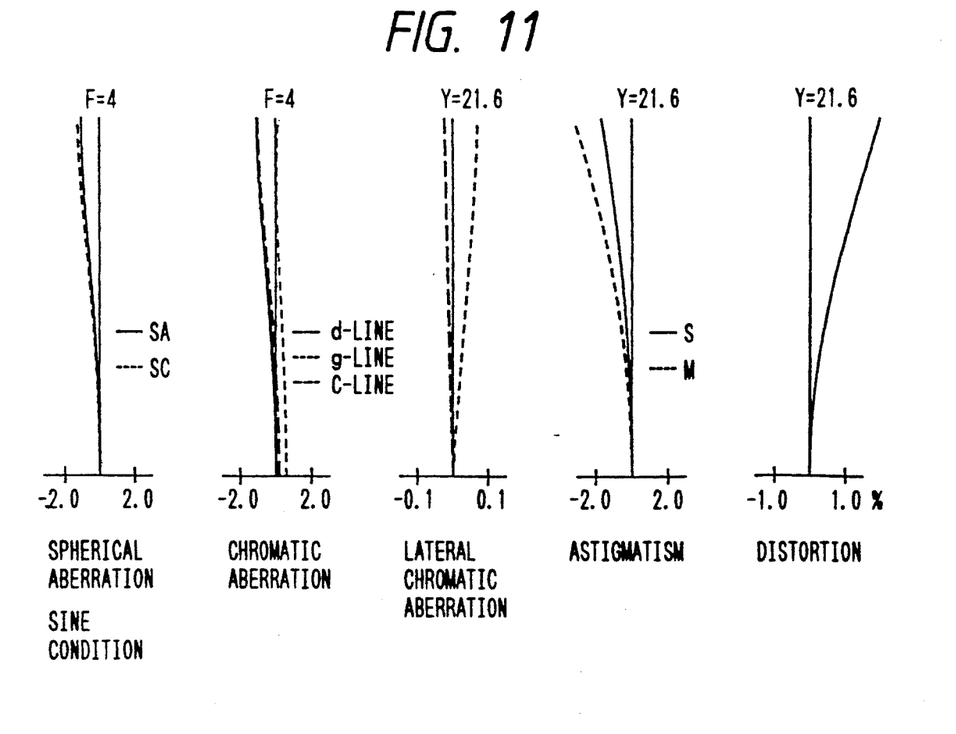
Figure 12:
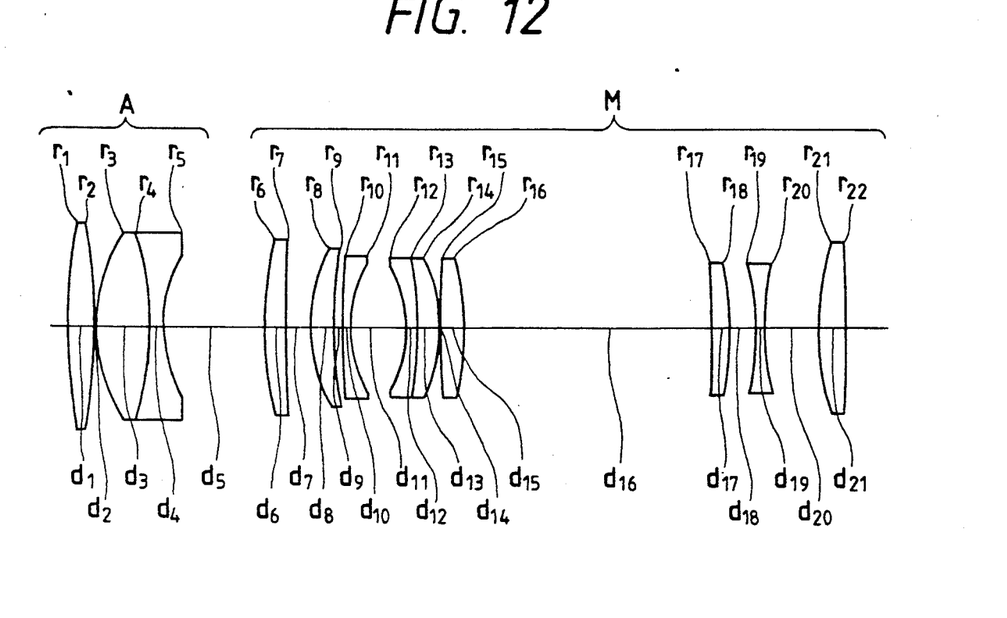
Figure 13:
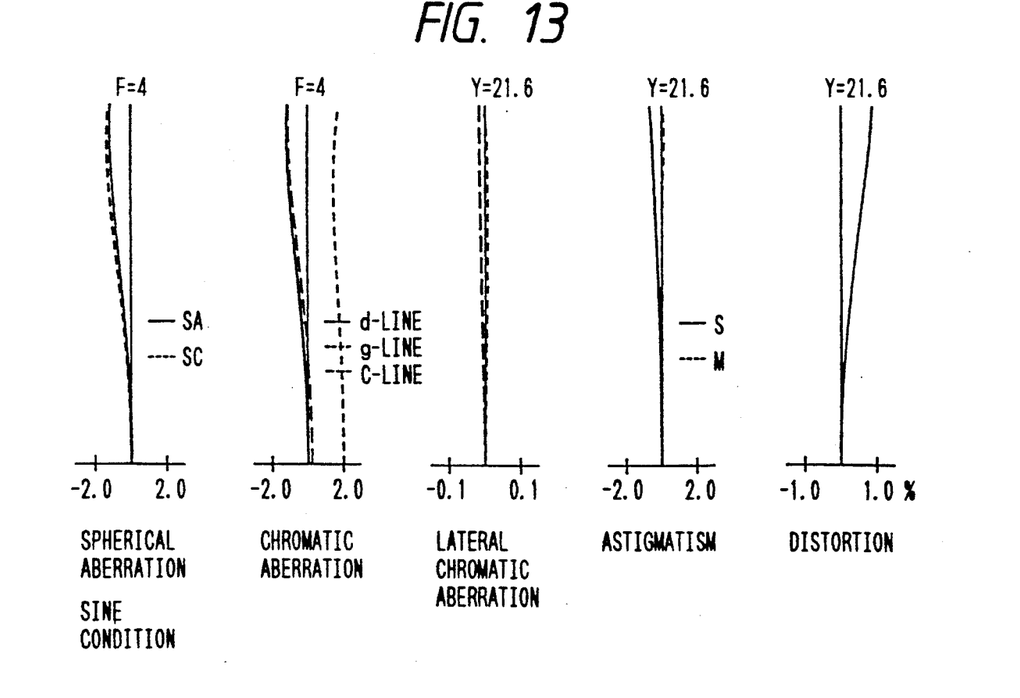

| | Surface No. | r | d | N | $v$ |
|---|---|---|---|---|---|
| A | 1 | 106.150 | 5.26 | 1.61800 | 63.4 |
| | 2 | −106.150 | 0.20 | | |
| | 3 | 34.057 | 10.74 | 1.64000 | 60.1 |
| | 4 | −56.940 | 2.44 | 1.69500 | 42.2 |
| | 5 | 28.783 | 20.00 | | |

M is the same as that of Example 1.
(1) $h_1/h_M = 1.19$
(2) $f_A/f_{AL} = -2.14$ (3) $\dfrac{d_{II} + d_{III}}{f_A} = 0.149$ (4) $r_{III1}/r_{III2} = 1.182$
(5) $f_A/f_1 = 1.20$ (6) $\dfrac{v_I + v_{II}}{2} - v_{III} = 19.6$ (7) $r_{III1}/f_A = -0.64$

Example 4

$F_{NO} = 1:4$  $f_A = 83.46$
$m = -1.20 - -2.18$  $f_B = 45.51$
WD = 101.6 − 63.7

Figure 14:
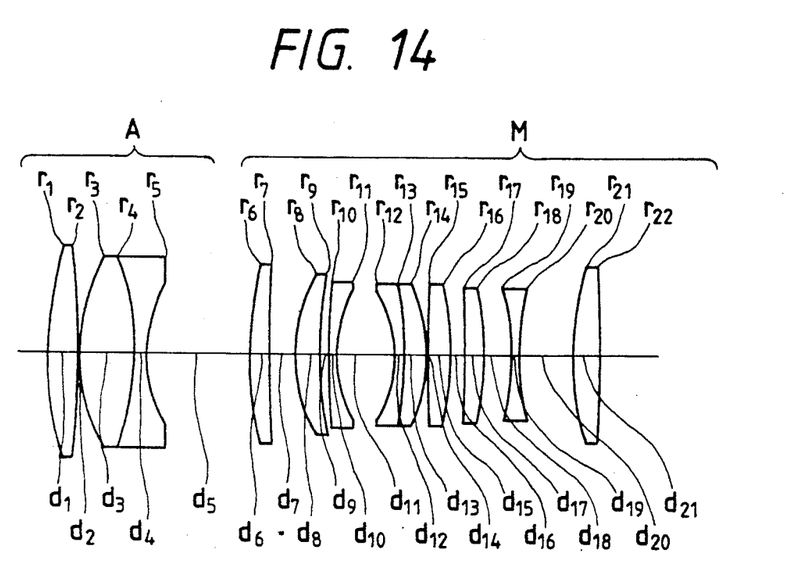
Figure 15:
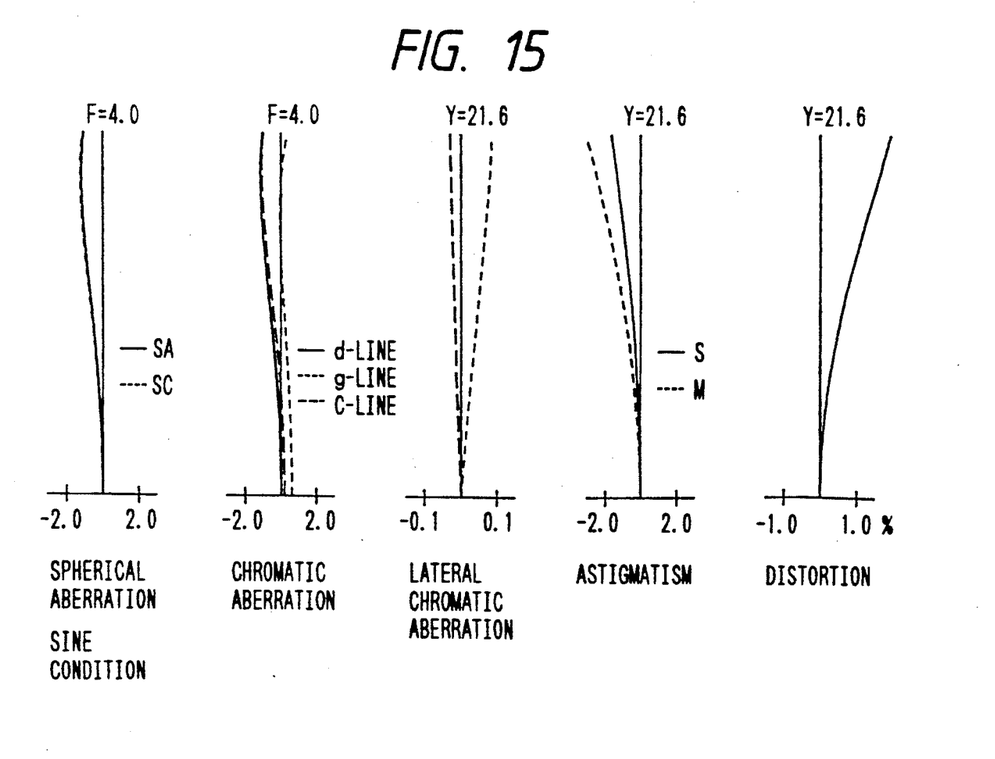
Figure 16:
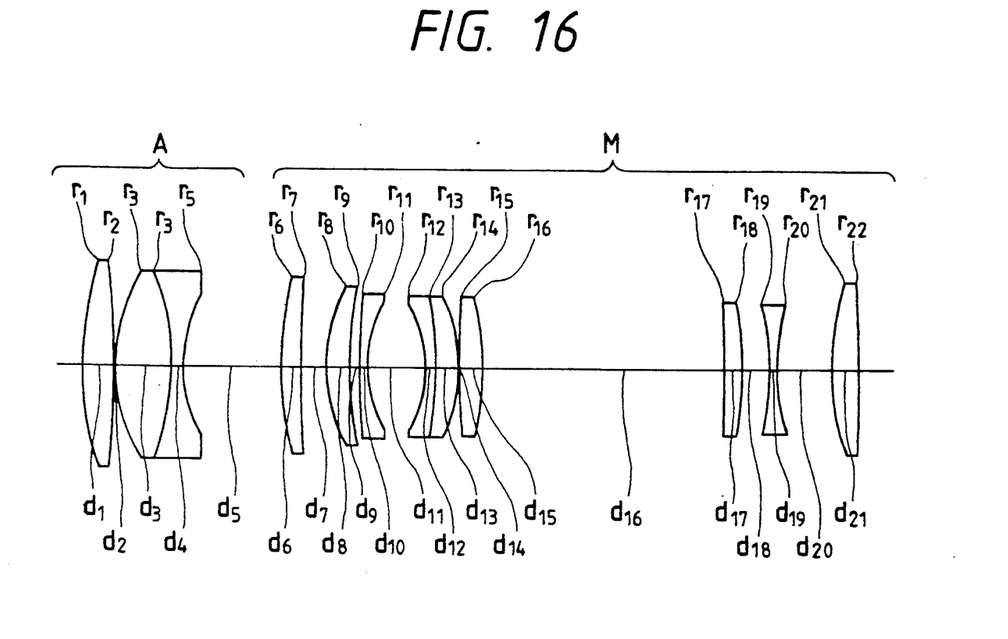
Figure 17:
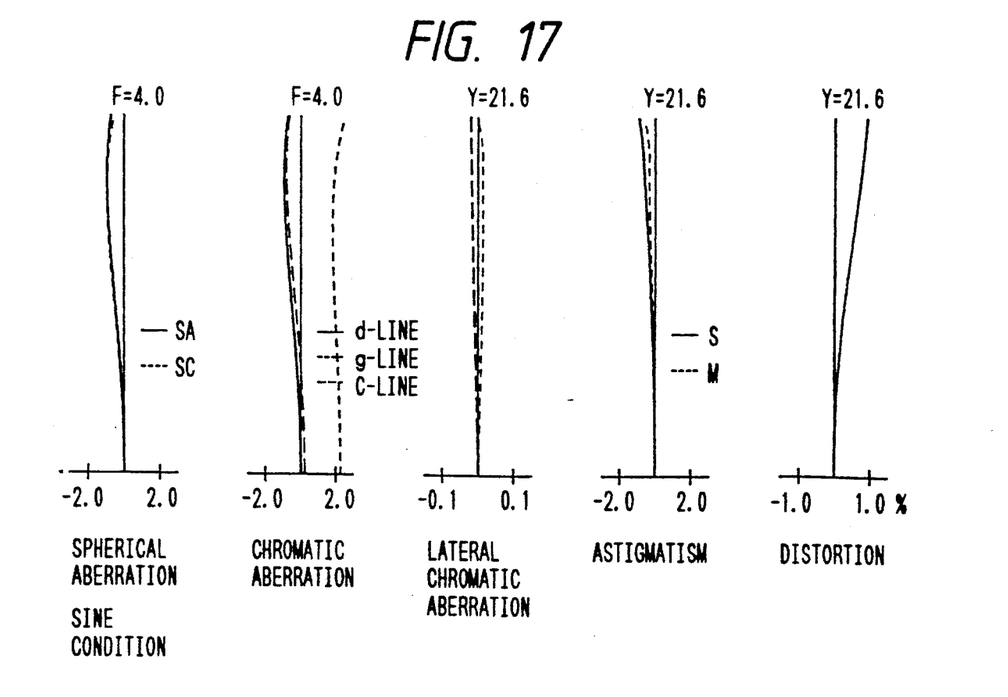

| | Surface No. | r | d | N | $v$ |
|---|---|---|---|---|---|
| A | 1 | 63.000 | 6.211 | 1.65830 | 57.3 |
| | 2 | −159.486 | 0.200 | | |
| | 3 | 36.658 | 11.137 | 1.64000 | 60.1 |

-continued

|   | 4 | −46.599 | 2.000  | 1.70154 | 4.12 |
|---|---|---------|--------|---------|------|
|   | 5 | 27.450  | 20.000 |         |      |

M is the same as that of Example 1.
(1) $h_1/h_M = 1.22$
(2) $f_A/f_{AL} = -1.95$ (3) $\dfrac{d_{II} + d_{III}}{f_A} = 0.157$ (4) $r_{III1}/r_{III2} = 1.34$
(5) $f_A/f_1 = 1.20$ (6) $\dfrac{\nu_I + \nu_{II}}{2} - \nu_{III} = 17.5$ (7) $r_{III1}/f_A = -0.56$ Example 5
$F_{NO} = 1:4 \quad f_A = 89.04$
$m = -1.125 - -2.128 \quad f_B = 45.51$
$WD = 105.0 - 63.1$

Figure 18:
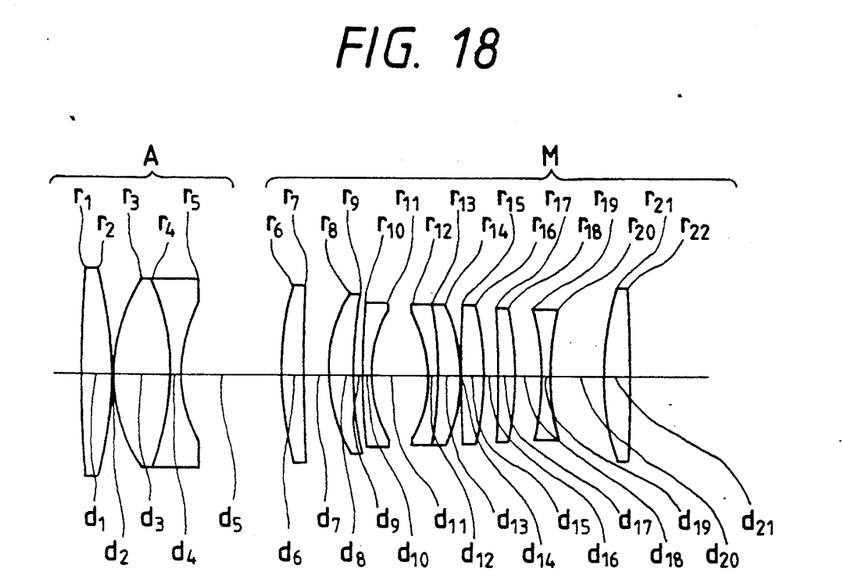
Figure 19:
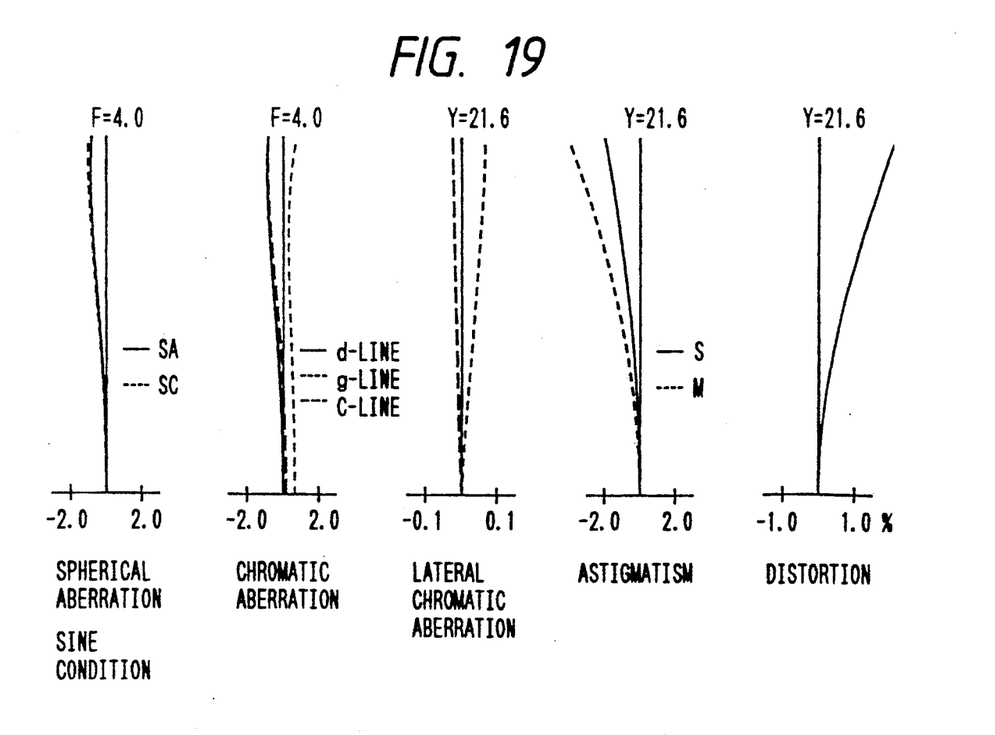
Figure 20:
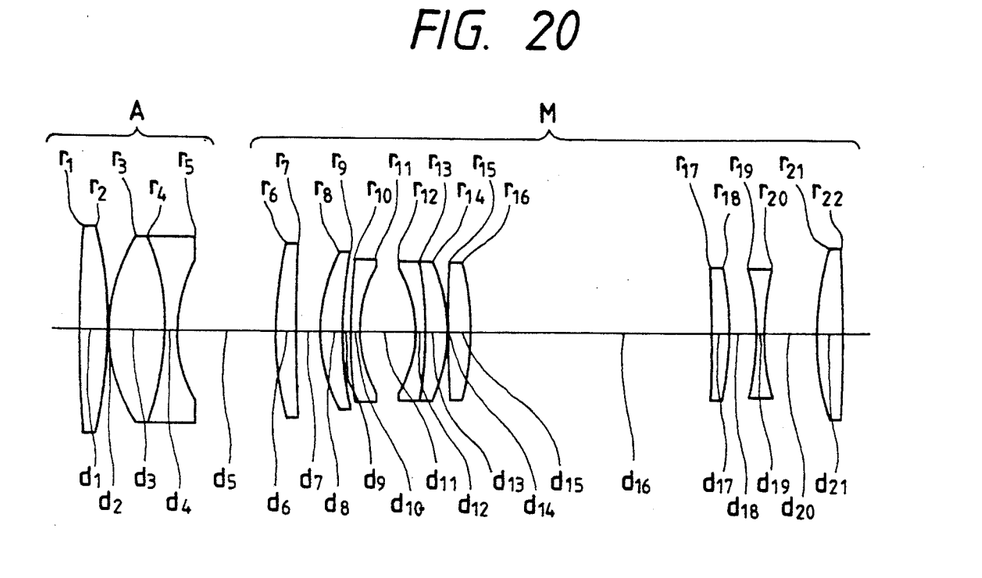
Figure 21:
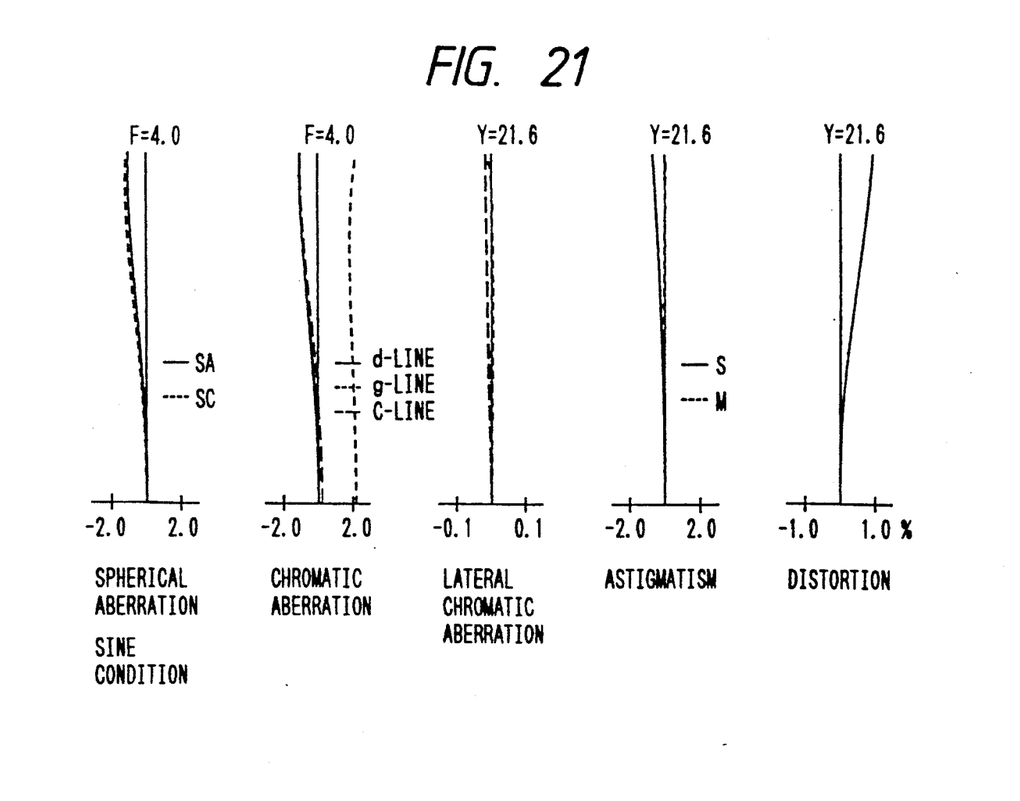

| Surface No. |   | r        | d     | N       | v    |
|-------------|---|----------|-------|---------|------|
|             | 1 | 208.715  | 5.97  | 1.62041 | 60.3 |
|             | 2 | −80.948  | 0.20  |         |      |
| A           | 3 | 32.615   | 11.62 | 1.64000 | 60.1 |
|             | 4 | −45.972  | 2.00  | 1.69500 | 42.2 |
|             | 5 | 28.987   | 20.00 |         |      |

M is the same as the Example 1.
(1) $h_1/h_M = 1.18$
(2) $f_A/f_{AL} = -2.13$ (3) $\dfrac{d_{II} + d_{III}}{f_A} = 0.153$ (4) $r_{III1}/r_{III2} = 1.13$
(5) $f_A/f_1 = 0.94$ (6) $\dfrac{\nu_I + \nu_{II}}{2} - \nu_{III} = 18.0$ (7) $r_{III1}/f_A = -0.52$ Example 6
$F_{NO} = 1:4 \quad f_A = 94.83$
$m = -1.057 - -2.088 \quad f_B = 45.51$
$WD = 109.1 = 63.7$

Figure 22:
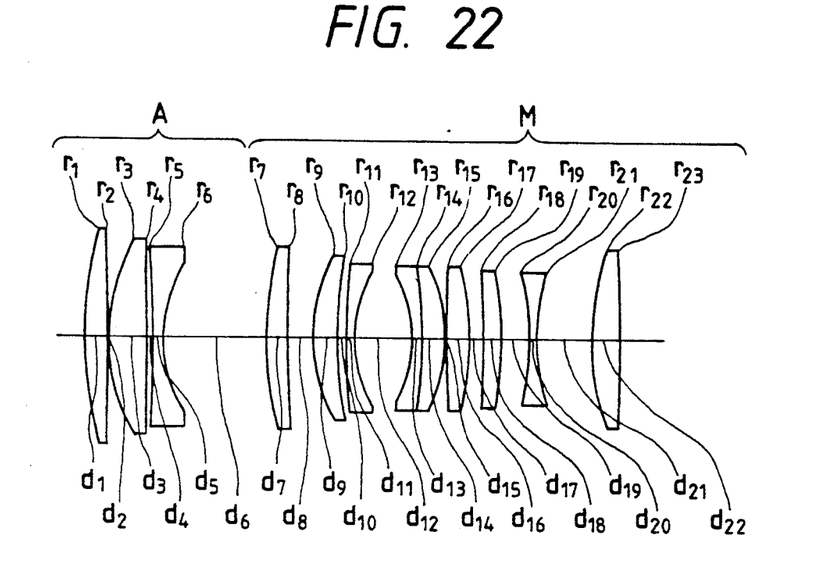
Figure 23:
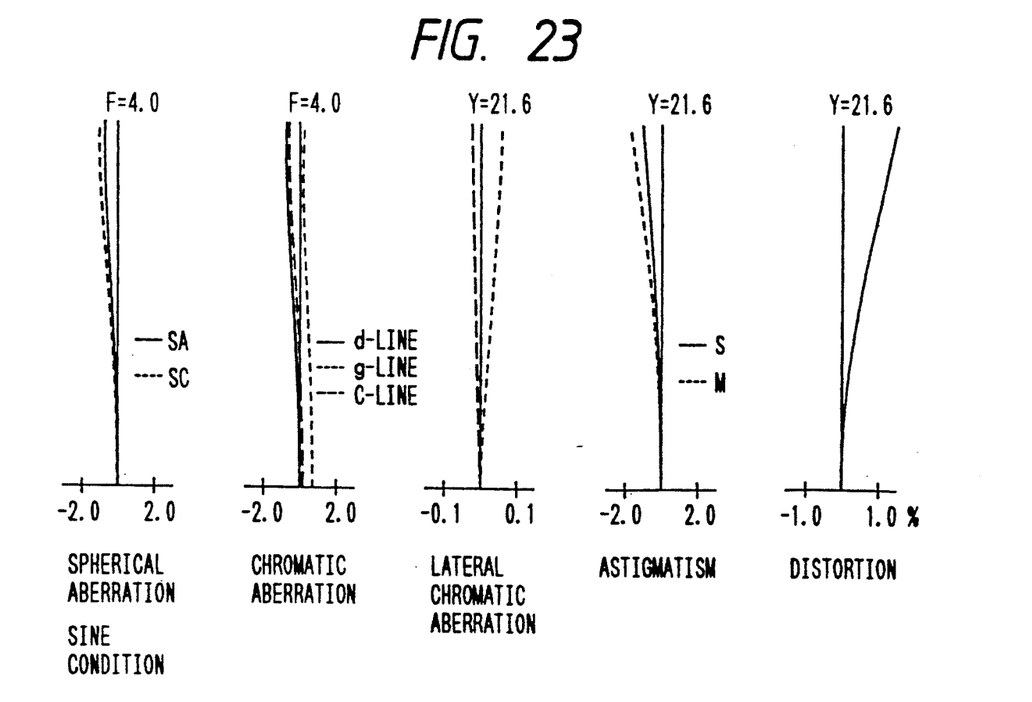
Figure 24:
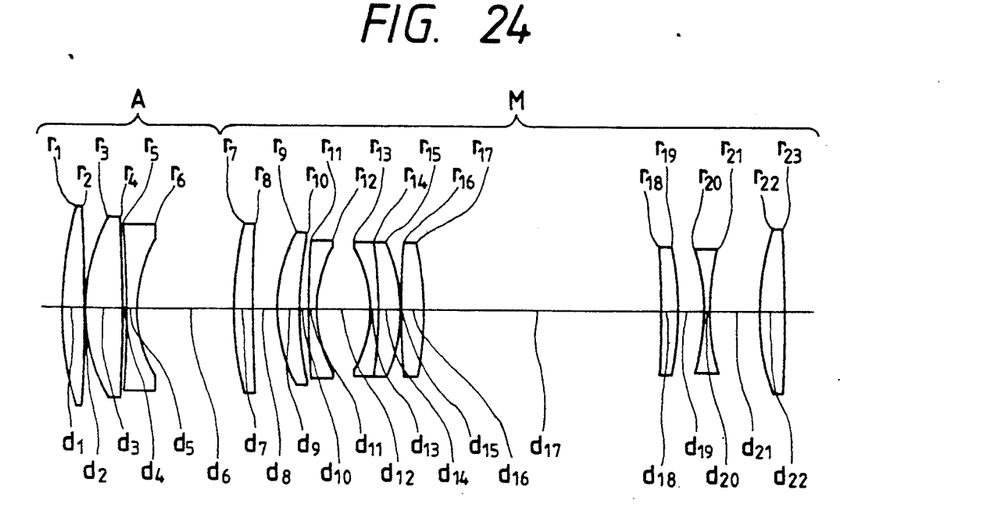
Figure 25:
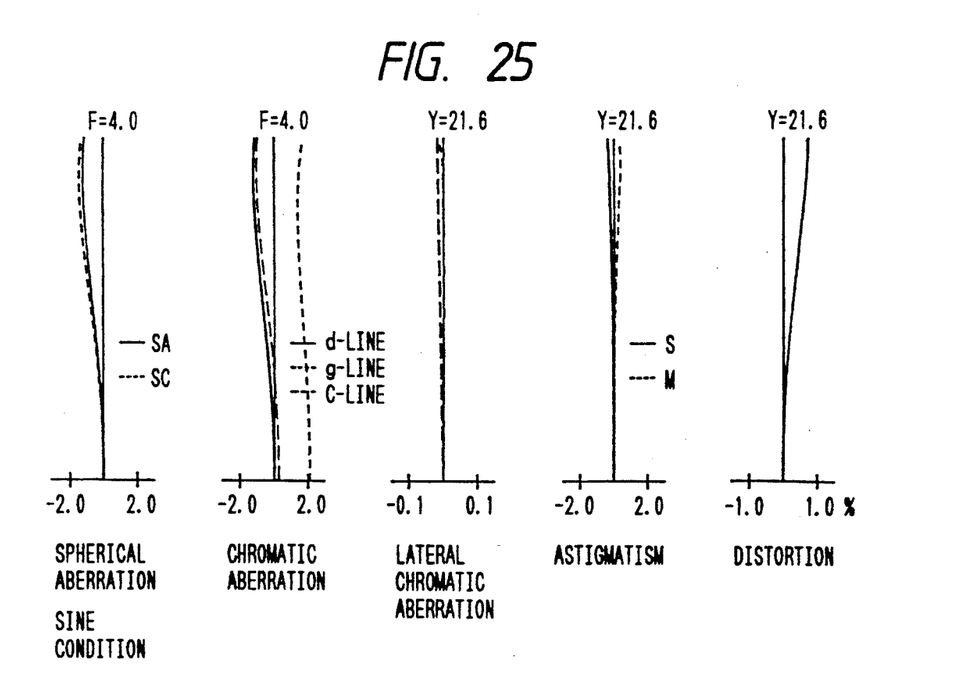

| Surface No. |   | r         | d     | N       | v    |
|-------------|---|-----------|-------|---------|------|
|             | 1 | 74.390    | 4.38  | 1.64250 | 58.4 |
|             | 2 | −369.102  | 0.20  |         |      |
| A           | 3 | 36.993    | 7.43  | 1.69680 | 56.5 |
|             | 4 | −835.347  | 0.98  |         |      |
|             | 5 | −290.874  | 2.00  | 1.59270 | 35.3 |
|             | 6 | 27.082    | 20.00 |         |      |

M is the same as that of Example 1.
(1) $h_1/h_M = 1.15$
(2) $f_A/f_{AL} = -2.08$ (3) $\dfrac{d_{II} + d_{III}}{f_A} = 0.10$ (4) $r_{III1}/r_{III2} = 1.37$
(5) $f_A/f_1 = 0.98$ (6) $\dfrac{\nu_I + \nu_{II}}{2} - \nu_{III} = 22.2$ (7) $r_{III1}/f_A = -3.1$ As seen from the foregoing description, in an attachment lens for close-up photography according to the present invention, when it is attached to the front of a master lens, the aberrations are satisfactorily compensated over a broad range of magnifications, while keeping an enough working distance.

While the invention has been described using some specific embodiments, it should be understood that the invention may variously be modified and changed within the spirit and scope of the appended claims.

What is claimed is:

1. An attachment lens system for close-up photography in use with a master lens system in such a fashion that said attachment lens system is attached to the front of said master lens system, comprising:

a first lens as a positive component;

a second lens whose face on the object side is convex, said second lens serving as a positive component;

a third lens whose face on the master lens system side is concave, said third lens serving as a negative component; and said first to third lenses being arranged in this order from the object to said master lens system, said attachment lens system meeting the following conditions:

$$1.10 < h_1/h_M < 1.35 \quad (1)$$

$$-3.0 < f_A/f_{AL} < -1.0 \quad (2)$$

$$0.10 < \dfrac{d_{II} + d_{III}}{f_A} < 0.25 \quad (3)$$

where $h_I$ is the incident height of the paraxial rays on the face of the attachment lens system, which is closest to the object, when the master lens is placed in an afocal state, $h_M$ is the incident height of the paraxial rays on the face of the attachment lens system, which is closest to the master lens system, when the master lens system is placed in an afocal state, $f_A$ is the focal distance of the attachment lens system, $$f_{AL} = \dfrac{r_{III2}}{1 - n_{III}}$$

is the focal distance of the face of the attachment lens closest to the master lens system, $r_{III2}$ is the radius of curvature of a second face of the third lens, $n_{III}$ is the refractive index of a d-line of the third lens, and $d_{II}$, $d_{III}$ is the thickness of the second and third lens.

2. The attachment lens system according to claim 1, in which the following conditions are met:

$$0.9 < r_{III1}/r_{III2} < 1.5 \quad (4)$$

$$0.7 < f_A/f_1 < 1.3 \quad (5)$$

$$12 < \dfrac{\nu_I + \nu_{II}}{2} - \nu_{III} \quad (6)$$

where $r_{III1}$ is the radius of curvature of a first face of the second lens, $f_1$ is the focal distance of the first lens, and $\nu_I$, $\nu_{II}$, $\nu_{III}$ is the Abbe numbers of the first to third lenses.

3. The attachment lens system according to claim 1, in which said second and third lenses are cemented in the form of a meniscus lens, a convex face thereof being directed to the object, and said lenses contain three components in two groups, and the following condition is met:

$$-1.0 < r_{III1}/f_A < -0.4 \quad (7)$$

where $r_{III1}$ is the radius of the first face of said third lens.

4. The attachment lens system according to claim 2, in which said second and third lenses are cemented in the form of a meniscus lens, a convex face thereof being directed to the object, and said attachment lens system contains three lens components in two groups, and the following condition is met:

$$-1.0 < r_{III1}/f_A < -0.4 \qquad (7)$$

where $r_{III1}$ is the radius of the first face of said third lens.

5. The attachment lens system according to claim 1, in which said said attachment lens contains three lens components in three groups, and the following condition is met:

$$-5.0 < r_{III1}/f_A < 1.5 \qquad (8)$$

where $r_{III1}$ is the radius of the first face of said thirs lens.

6. The attachment lens system according to claim 2, in which said said attachment lens system contains three lens components in three groups, and the following condition is met:

$$-5.0 < r_{III1}/f_A < 1.5 \qquad (8)$$

where $r_{III1}$ is the radius of the first face of said third lens.

* * * * *

UNITED STATES PATENT AND TRADEMARK OFFICE
CERTIFICATE OF CORRECTION

PATENT NO. : 5,216,546
DATED : June 1, 1993
INVENTOR(S) : Sachio Hasushita

It is certified that error appears in the above-indentified patent and that said Letters Patent is hereby corrected as shown below:

Title page, item [73], Assignee: delete "Asashi" and insert --Asahi--.

Signed and Sealed this

Twenty-fourth Day of October, 1995

Attest:

BRUCE LEHMAN

Attesting Officer     Commissioner of Patents and Trademarks